June 7, 1960
F. W. SMALLEY
2,939,541
MOUNTING AND LOCK MEANS FOR A FORWARDLY TILTING MOTOR VEHICLE CAB
Filed July 14, 1958
2 Sheets-Sheet 2
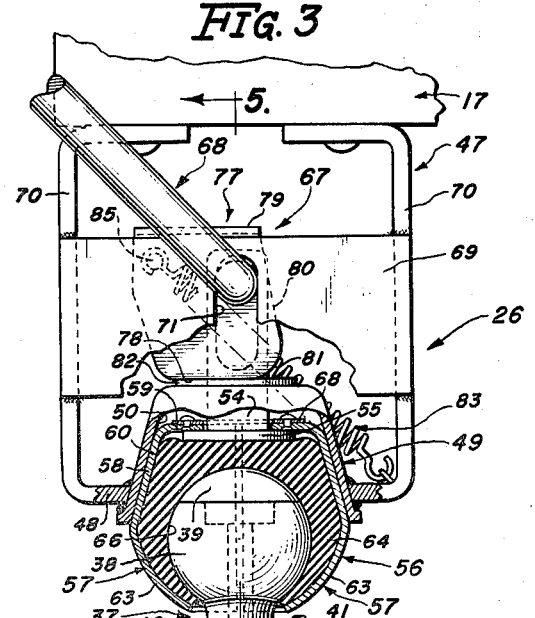
FIG. 3
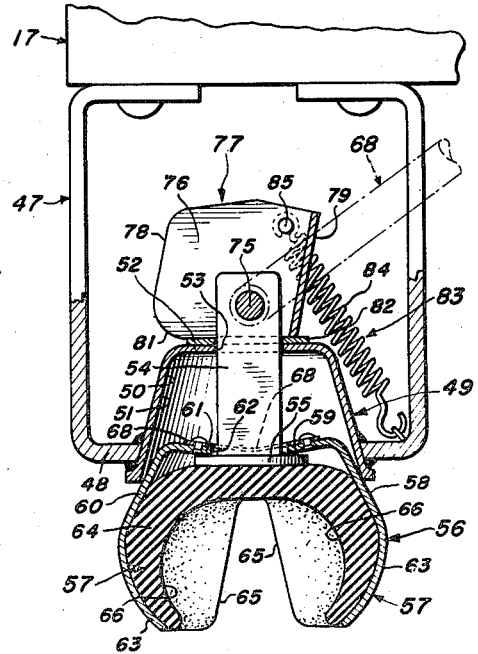
FIG. 4
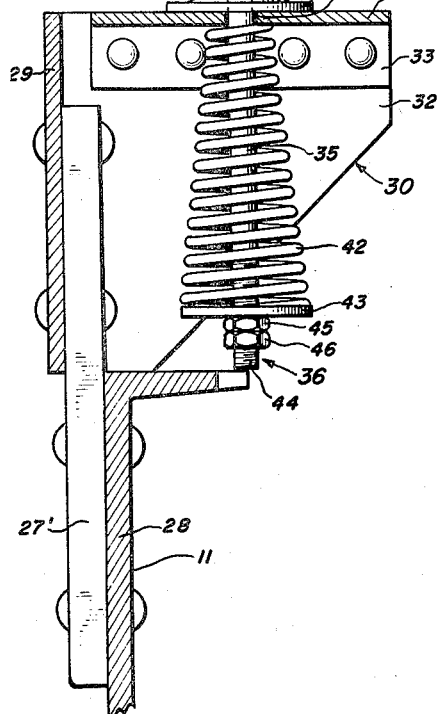
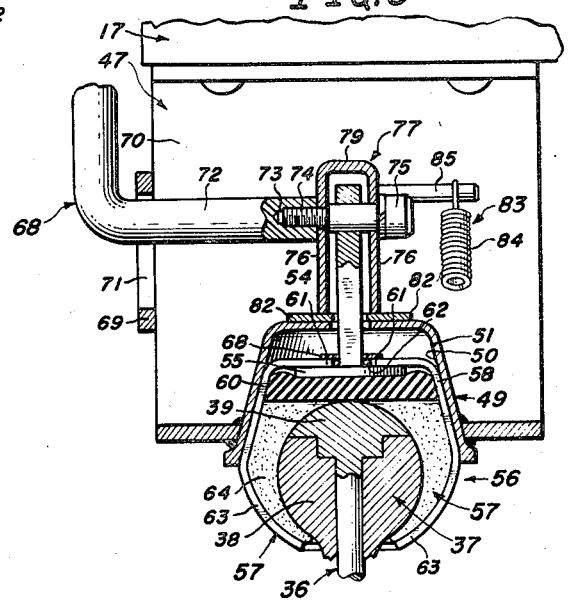
FIG. 5
INVENTOR
Francis W. Smalley
Paul O. Pippel
ATTORNEY

# United States Patent Office 2,939,541
Patented June 7, 1960

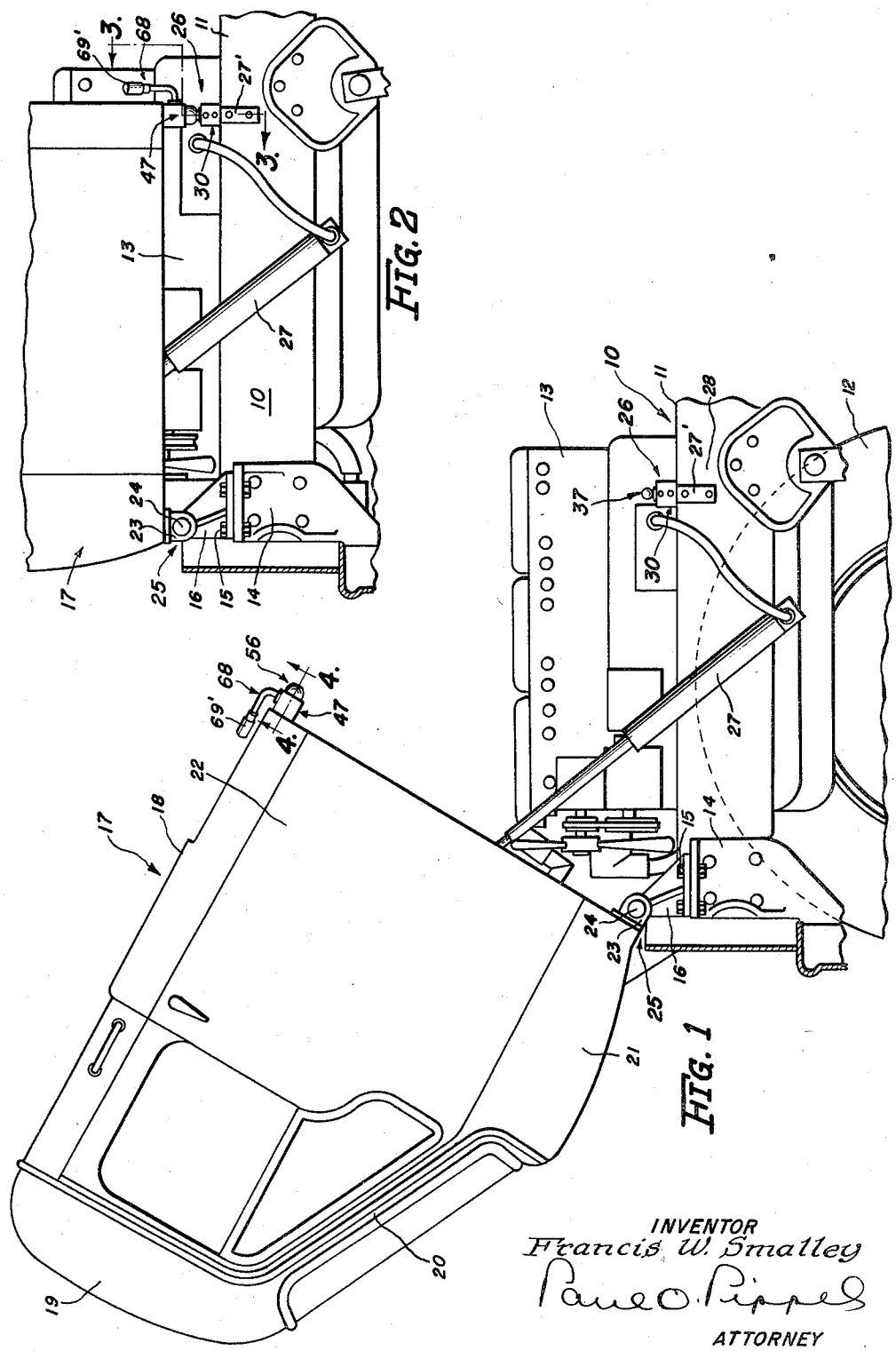

2,939,541

MOUNTING AND LOCK MEANS FOR A FORWARDLY TILTING MOTOR VEHICLE CAB

Francis W. Smalley, Berkeley, Calif., assignor to International Harvester Company, Chicago, Ill., a corporation of New Jersey Filed July 14, 1958, Ser. No. 748,450

8 Claims. (Cl. 180—89)

This invention relates to a new and improved mounting and lock means for a forwardly tilting cab-over-engine type of motor vehicle and more particularly to a pair of structures for releasably securing the rearward end of a forwardly tiltable vehicle cab to the chassis frame and for permitting limited flexibility between the vehicle chassis frame and the cab when the structures are in their secured or locked conditions.

Automotive engineers have effectively mitigated the damaging influence of the torsional forces imposed on the chassis frame, generally caused by one or more ground-engaging wheels being elevated differently than the others as when the vehicle is driven over an uneven terrain or road surface irregularities, by providing a chassis frame which is relatively flexible and capable of relieving the torsional forces imposed thereon. Heretofore it has been the usual practice in the motor truck industry to secure the vehicle cab directly to the chassis frame in such a manner that very little, if any, relative movement between the chassis frame and the vehicle cab was permitted. Consequently, the distorting forces and shocks to which the chassis frame was subjected were transmitted directly and fully to the vehicle cab causing deformation of the sheet metal parts of the vehicle cab and ultimate breakage thereof.

With the commercial introduction of forwardly tilting cab-over-engine type trucks wherein the cab or operator's compartment is mounted directly over the vehicle propulsion engine or power plant and is capable of tilting forwardly to provide accessibility to the engine and engine appurtenances, the problem of mounting the vehicle cab on the chassis frame became more acute. Certain of the mounting connections obviously must be disconnectable to permit tilting of the cab with respect to the chassis frame. It is, therefore, the primary objective of the present invention to provide a novel mounting and releasable lock structure for the rearward end of a forwardly tilting cab-over-engine type motor truck which allows a limited but adequate relative movement between the cab and chassis frame whereby the distorting forces, shocks and vibrations to which the chassis frame is subjected are transmitted to a lesser degree to the cab than heretofore possible and to have incorporated therein means to positively lock the vehicle cab to the chassis frame but which is readily releasable to permit forward tilting of the cab with respect to the chassis frame.

Still another object is to provide a pair of structures for connecting the rear end of a forwardly tilting cab-over-engine type vehicle to the chassis frame, which structures function as resilient supporting means when the vehicle cab is in its normally lowered position as well as releasable lock devices for securing the vehicle cab in its normally lowered position.

Another object is the provision of a simple, inexpensive sturdily built structure for releasably connecting a portion of a vehicle cab capable of swinging forwardly from a normally lowered position to the chassis frame.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a side elevational view of the forward end of a tilt cab type c-o-e motor truck embodying the invention; the cab is shown in its raised or engine exposing position;

Figure 2 is a side elevational view similar to Figure 1 with the exception thatt he operator's compartment or cab is shown in its lowered or engine enclosing position;

Figure 3 is a sectional view taken substantially along line 3—3 of Figure 2;

Figure 4 is a sectional view taken substantially along line 4—4 of Figure 1; and Figure 5 is a sectional view taken substantially along line 5—5 of Figure 3.

Referring to the drawings in detail, wherein like reference characters represent like elements throughout the various views, there is shown the forward portion of a motor truck chassis frame 10 which includes a pair of transversely spaced longitudinally extending channel-shaped side sill members 11 (only one of which is shown in Figures 1 and 2) which are interconnected by transversely extending longitudinally spaced cross members, not shown. The root of the chassis frame 10 is supported off the ground by power-driven ground-engaging wheels not shown which are resiliently connected thereto by springs not shown in a conventional manner. It is to be understood that non-essential details not material to practice the invention therein have been eliminated and are not shown in order to clearly illustrate the invention. The forward end of the chassis frame 10 is supported by means of steerable ground-engaging wheels 12, one of which is partially shown in Figure 1.

The vehicle power plant or engine generally designated by numeral 13, is resiliently mounted in a suitable manner adjacent the forward end of the chassis frame and centrally thereof. Attached to the extreme forward end of each side sill member 11 is a bracket 14. Secured to the top surface of each bracket 14 by means of bolts 15 is a cab trunnion or hinge element 16.

The operator's compartment or cab 17 includes a back panel 18 joined to a roof 19 which in turn is connected to a windshield frame 20. The windshield 20 is integrally formed with a depending front panel 21. A pair of doors 22 (one of which is shown in Figure 1) are pivotally mounted to door pillar posts not shown adjacent the transverse edges of the front panel 21. The operator's compartment 17 also includes a frame which is utilized to interconnect the various body parts enumerated above to increase the strength and rigidity of the assembled operator's compartment. Secured to the underside of the cab frame adjacent the forward end of the operator's compartment 17 are a pair of bifurcated cab hinge elements 23, one of which is shown in Figures 1 and 2. Pivot pins 24 are carried by the bifurcations of the hinge elements 23 and are employed to pivotally connect the hinge elements 23 to the hinge elements 16. From the foregoing it will be appreciated that the operator's compartment 17 is capable of pivoting with respect to the chassis frame 10 about a transversely extending horizontal axis from the position shown in Figure 2 to the position shown in Figure 1. Link means (not shown) are provided to limit the swing of the operator's compartment 17 in the position shown in Figure 1. Each hinge connection 25, which includes a hinge element 23, a hinge element 16 and a pivot pin 24, serves as the means for supporting a forward portion of the vehicle cab operator's compartment 17 on the chassis frame 10. Normally the operator's compartment 17 is in the position shown in Figure 2 wherein the front end thereof is supported by the chassis frame and through the intermediary of the hinge connections 25 and the rear end thereof is supported by the chassis frame 10 through the intermediary of a pair of releasable cab mounting devices 26 which will be explained hereafter in detail. When the cab mounting connections 26 are released or unlocked, the cab 17 is free to be swung forwardly about the pivotal axis defined by the pivot pins 24 interconnecting each pair of hinge members 16, 23. Power actuated means in the form of a hydraulic piston and cylinder unit 27 having one end pivotally connected to the underside of the vehicle operator's compartment 17 and its opposite end pivotally connected to the chassis frame 10 is utilized to provide the effort required to swing the operator's compartment forwardly from its normally lowered position to its forwardly tilted engine exposing position as shown in Figure 1.

As stated hereinbefore, the rear end of the vehicle cab 17 is connected to the chassis frame 10 by means of a pair of releasable mounting connections 26. The releasable mounting connection 26 positioned on the left side sill member 11 will be described in detail, but it is to be understood that the transversely spaced releasable mounting connection 26 positioned on the right side sill member is a substantial duplicate thereof. The releasable mounting connection 26 includes an upright bar 27' which has its lower portion riveted to the web 28 of the side sill member 11. A portion of the plate 27 extends above the top of the side sill member 11 as shown in Figure 3 and has the bight portion 29 of a substantially U-shaped support bracket 30 rigidly fixed thereto. A substantially flat horizontal plate 31 extends between and bridges the space between the legs 32 of the support bracket 30. Two of the opposite ends of the plate 31 are provided with depending flanges 33 which are riveted to the legs 32, as shown in Figure 3. The plate 31 is provided with a central aperture 34 therethrough through which the shank 35 of an elongated bolt 36 is adapted to extend. The bolt 36 serves as part of a male element designated generally by numeral 37. The male element 37 also includes a ball member 38 which is rigidly secured to the enlarged head portion 39 of the bolt 36 by any suitable means. The ball member includes a reduced-diameter neck section 40 integrally formed with a shoulder portion 41 which bears against the upper surface of the plate 31. The shouldered portion 41 is yieldably pressed into engagement with the upper surface of the plate 31 by means of a helically wound compression spring 42 which encircles the shank 35 of the bolt 36 and is adapted to bear against the underside of the plate 31 at one end and against a spring retainer 43 slidably carried by the shank 35. The lowermost or end opposite the enlarged head portion 39 of the bolt 36 is provided with a threaded section 44 upon which an adjusting nut 45 is threaded. By turning the nut 45 to move the same upwardly or downwardly the compression of the spring 42 may be varied. A lock nut 46 is also threaded on the threaded section 44 and is adapted to abut the adjusting nut 45 to lock the same in its adjusted position. From the foregoing it will be appreciated that the male element 37 is yieldably urged downwardly by the spring 42 whereby the shouldered portion 41 of the ball member 38 is pressed into engagement with the top surface of the plate 31. However, the male element is capable of moving vertically upwardly with respect to the supporting bracket 30 when a sufficient upwardly directed force is applied to the male element 37 to compress the compression spring 42.

A depending substantially U-shaped bracket 47 is suitably secured to the underside of the operator's compartment 17 adjacent the back panel 18. The bight portion 48 of the depending bracket 47 is provided with a central aperture in which an inverted cup or bell-shaped camming member 49 is secured as by welding or the like. The interior surface 50 of the camming member 49 is formed to be similar to the outer surface of a frustum of a cone. Thus it will be appreciated that the curved surface portion 51 of the interior surface 50 of the camming member 49 is inclined upwardly and inwardly as viewed in Figure 4. The closed end of the bell-shaped camming member 49 is defined by a flat wall portion 52 which is provided with a central rectangular slot 53 therethrough through which an elongated stem 54 extends. One end of the stem 54 is provided with an enlarged flange-like head 55 and the end opposite therefrom is provided with a circular aperture. The female element, designated generally by numeral 56, which is adapted to cooperate with the male element 37 to releasably connect the operator's compartment 17 to the chassis frame also includes a pair of identical socket members 57. Each socket member 57 includes a portion 58 which is in the form of one-half of a frustum of a cone to provide a semi-circular flat wall 59 and a curved, upwardly and inwardly inclined wall 60 as viewed in Figure 3. The marginal edges 61 of the walls 59 lie closely adjacent to each other and are each provided with a slot 62 to accommodate the stem 54. The flange-like head 55 of the stem 54 serves as a ledge upon which the walls 59 of the socket members 57 are adapted to lie as shown in Figures 3, 4 and 5. Each socket member 57 also includes a wall portion 63 which depends from and is integrally formed with the wall portion 60 and is in the form of a segment of a sphere.

As shown in Figures 3, 4, and 5, a leaf spring 68 is suitably secured to the walls 59 of the socket members 57. The spring 68 is provided with a slot through which the stem 54 extends. The spring 68, when in its untensioned condition, is in the form shown in Figure 4. In other words, the spring 68 tends to yieldably urge the socket members 57 to the position illustrated in Figure 4 which position corresponds to the opened or released condition of the female element 56.

An insert 64, made of rubber or other material having like or similar physical properties, is disposed between the socket members 57 and is of a size and has an outer configuration such that when the socket members 57 are in their released positions, as shown in Figure 4, the insert 64 firmly frictionally engages the inner surfaces of the wall portions 63 and substantially the entire inner surfaces of the curved outwardly and inwardly inclined walls 60. The underside of the flange-like head 55 of the stem 54 is also firmly pressed by the insert 64. If desired the insert can be bonded or otherwise secured to the same surfaces of the socket members 57 and the flange-like head 55. As best shown in Figure 4, the rubber insert 64 is slotted to provide a pair of flat faces 65. The faces 65 are adapted to lie closely adjacent to each other when the socket member 56 is in its closed position as shown in Figure 3. Formed in each face is a semi-spherical recess 66 which cooperates with the recess 66 formed on the other face 65 to define a substantially spherical cavity or pocket for receiving the ball portion of the ball member 38 as shown in Figures 3 and 5. From the foregoing it is believed the function and operation of the male element 37 and the cooperating female element 56 to releasably lock the vehicle cab 17 to the chassis frame 10 is clear. When the female element 56 is in the opened or released position wherein the socket members 57 are forced outwardly by the rubber insert 64 and the leaf spring 68, the mouth opening into the interior of the insert 64 is sufficiently large enough to permit insertion of the ball portion of the ball member 38. Thereafter the weight of the vehicle cab 17 effects relative movement of the camming member 49 downwardly with respect to the socket members 57. By virtue of the frusto-conical nature of the cooperating surfaces of the inclined walls 60 of the socket members 57 and the interior surface 50 of the camming member 49 such relative vertical movement between the socket members 57 and the camming member 49 causes the socket members to pivot toward each other about the enlarged flange-like head 55 of the stem 54 to a closed position as shown in Figure 3, wherein the flat faces 65 lie closely adjacent to each other and the ball of the ball member 38 is firmly gripped by the rubber insert 64 which is under compression between the ball member 38 and the socket members 57 and the underside of the flange-like head 55 of the stem 54. The leaf spring 68 is substantially flat when the female element 56 is in this condition and is applying a resilient force to said socket members 57 tending to pivot socket members away from each other.

In order to lock the male and female elements 37, 56 together and prevent inadvertent release of the elements during operation of the motor vehicle, a releasable locking device, designated generally by numeral 67, is employed. The releasable locking device 67 includes a manually operable handle 68. The handle 68 is substantially L-shaped and has one end provided with a hand grip portion 69'. A flat plate 69 extends across and is suitably secured to the legs 70 of the depending bracket 47. The plate 69 is provided with a vertical guide slot 71 therethrough through which one leg 72 of the handle 68 is adapted to extend. The width of the slot 71 is slightly larger than the diameter of the handle portion 72 such that the handle may rotate and slide vertically with respect to the bracket 47 but is incapable of moving horizontally with respect thereto. The inner end of the handle portion 72 is provided with a threaded aperture 73 for receiving the threaded end 74 of a shoulder bolt 75. The shoulder bolt 75 extends through the leg portions 76 of a cam element 77 and the aperture formed in the upper end of the stem 54 which is disposed between the leg portions 76. The shoulder bolt 75 serves as the means for rigidly attaching the cam element 77 to the handle 68 so as to be movable therewith and as the means for pivotally connecting the stem 54 to the handle 68. The bottom marginal edges 78 of the legs 76 are substantially parallel to the bight 79 of the cam element 77. The bottom marginal edges 78 lie in a plane disposed at an angle slightly less than 90° to a plane containing the flat side marginal edges 80 of the legs 76. The flat bottom edge 78 of each leg 76 is interconnected by a rounded heel portion 81 to an associated flat side edge 80. Encircling the stem 54 and adapted to rest on the upper surface of the camming member 49 is a washer-like shim 82. Either the flat edges 78 or the flat edges 80 of the legs 76 are adapted to abut the upwardly facing surface of the shim 82 depending upon the position of the handle 68. It will be noted that the radial distance between the axis of the handle portion 72 and the plane containing the flat edges 80 is less than the radial distance between the axis of the handle portion 72 and the plane containing the flat edges 78 such that when the handle member 68 is in its released position as shown in Figure 4, the handle portion 72 is disposed adjacent the bottom of the slot 71 and the flat edges 80 are in engagement with the shim 82. When the handle is rotated from the position shown in Figure 4 to the position shown in Figure 3 the rounded heel portions 81 bear against the upper surface of the shim 82 and the stem 54 is moved vertically to the position shown in Figure 3 wherein the flat edges 78 bear against the shim 82 and the handle portion 72 is disposed at the top of the slot 71. From the foregoing it will be appreciated that rocking of the handle 68 effects vertical movement of the stem 54 which in turn effects opening and closing of the socket members 57. In order to prevent inadvertent rocking of the handle 68 during the operation of the motor vehicle an overcenter spring device, designated generally by numeral 83, is provided. The overcenter spring device 83 includes a helically wound tension spring 84 having one end secured to the intersection of one of the legs 70 and the bight portion 48 of the bracket 47 and its opposite end attached to the cam element 77 by means of an axially extending pin 85 secured to one leg 76 of the cam element. From the foregoing it will be appreciated that the line of action of the spring force applied to the cam element 67 by the spring 84 is on one side of a line intersecting the axis of the handle portion 72 and the connection of the spring 84 to the bracket 47 when the handle 68 is in one position and is on the opposite side of the line intersecting the axis of the handle portion 72 and the connection of the spring 84 to the bracket 47 when the handle is in the position corresponding to the closed position of the socket members 57.

In normal operation of the vehicle over a comparatively level and smooth road bed the chassis frame twist is practically non-existent. Assuming that the vehicle cab 17 is in its normally lowered position, as shown in Figure 2, the entire weight of the vehicle cab 17 is transmitted to the chassis frame 10 through the pivot pin 24 and the releasable mounting connections 26. Twisting of the chassis frame 10 wherein one end of one of the side sill members 11 is raised is effectively accommodated without imposing severe damaging strains on the sheet metal parts of the vehicle cab structure. If one of the side sill members 11 is suddenly displaced vertically downwardly with respect to the other side sill member the resulting force is not transmitted to the vehicle cab structure 17 to tortionally distort the same since the spring 42 of the releasable mounting connection 26 associated with the vertically displaced side sill member yieldably permits such relative movement of the side sill members. Furthermore, the rubber inserts 64 serve as a cushion to prevent the transmission of noise and vibration from the chassis frame to the operator's compartment 17. It will also be appreciated that in addition to the damaging force absorption function of the releasable mounting connections 26 when only one of the side sill members is displaced vertically with respect to the other side sill member, distortion of the cab structure 17 is further eliminated by allowing the vehicle cab to rock about the axis extending through the pivot pins 24 when the rearward end sections of both side sill members 11 are displaced vertically together since both compression springs 42 resiliently resist relative movement of the cab structure with respect to the chassis frame 10 from its normally lowered position shown in Figure 2. It is believed obvious that a minimum amount of road shock is transmitted to the vehicle cab structure 17 by mounting the vehicle cab as described above. The damaging forces are effectively dissipated primarily by the resilient characteristic of the releasable mounting devices 26 and secondarily by the capability of the cab to rock relatively to the chassis frame 10. As pointed out above, such relative rocking movement is brought about by the novel construction and arrangement of the four-point cab mounting. Once the vehicle has passed over the road bed irregularity the vehicle cab 17 assumes a normal upright steadied position. It will also be appreciated that by utilizing the ball and socket principle in the releasable mounting connections 26 stability of the vehicle cab 17 in all directions with respect to the chassis frame is achieved.

When it is desired to raise the operator's compartment 17 from the position shown in Figure 2 to the position shown in Figure 3, both handles 68 are moved to their released positions against the resilient action of the overcenter spring devices 83 whereupon the socket members 57 are moved vertically downwardly with respect to the camming members 49 and the rubber inserts 64 are allowed to expand to force the socket members 57 outwardly away from each other sufficiently to permit passage of the balls of the male elements 37 therefrom. The piston and cylinder assembly 27 is then expanded to pivot the operator's compartment 17 about the pivot pin 24 from the position shown in Figure 2 to the position shown in Figure 1.

The embodiment of the invention chosen for the purposes of illustration and description herein is that preferred for achieving the object of the invention and developing the utility thereof in the most desirable manner, due regard being had to existing factors of economy, simplicity of design and construction and the improvements sought to be effected. It will be appreciated therefore that the particular structural and functional aspects emphasized herein are not intended to exclude, but rather to suggest, such other adaptations and modifications of the invention as fall within the spirit and scope of the invention as defined in the appended claims.

What is claimed is:

1. A motor vehicle having a longitudinal frame, a cab, and means for mounting said cab on said frame including a pair of transversely spaced pivot connecting means interconnecting a forward portion of said cab and said frame whereby said cab is capable of pivoting about a transversely extending axis between a normally lowered position and a raised forwardly tilted position; and a pair of transversely spaced ball and socket joints longitudinally spaced from said pivot connecting means yieldably interconnecting the rearward end of said cab and said frame whereby limited, resiliently resisted pivotal movement of said cab and ball and socket joints in one direction with respect to said frame is permitted, said ball and socket joints being releasable to permit pivoting of said cab about said transversely extending axis to its raised forwardly tilted poistion from its normally lowered position.

2. A motor vehicle substantially as set forth in claim 1, in which, each of said ball and socket joints includes a male element provided with a ball portion having a substantially spherical bearing surface and a female element including two relatively movable socket members, one of said elements being carried by said cab and the other of said elements being yieldably secured to said frame whereby said other of said elements is immovable with respect to said frame in one direction and is capable of limited, resiliently resisted movement in the opposite direction with respect to said frame, said movable socket members being movable between a locked position wherein the socket members operatably engage an associated ball portion and an unlocked position wherein said ball portion is released from engagement with said socket members; resilient means constantly tending to move said socket members relatively with respect to each other toward their unlocked position; cam means engageable with said socket members to force said socket members toward their locked position to engage said ball portion when said socket members are moved relatively with respect to said cam means in a particular direction; and a manually operable releasable lock device associated with each of said ball and socket joints for preventing movement of said socket members to their unlocked position from their locked position.

3. A motor vehicle having a longitudinal frame, a cab, and means for supporting said cab on said frame for controlled relative movement therebetween including, a pair of transversely spaced aligned pivot connecting means interconnecting the forward portion of said cab and said frame whereby said cab is capable of pivoting about a transversely extending axis between a normally lowered position and a raised forwardly tilted position; and a pair of transversely spaced and aligned connecting means longitudinally spaced from said pivot connecting means interconnecting the rearward portion of said cab and said frame, each of said connecting means including a female element comprising a pair of pivotally supported cooperating socket members, each of said socket members having an outer surface portion thereof in the form of one-half of a frustum of a cone, each of said connecting means further including a male element having a substantially spherical portion, one of said elements being carried by said frame and the other said elements being carried by said body, a rubber-like insert disposed between and carried by said socket members, said insert being provided with a pair of flat faces each of which has a semi-spherical recess formed therein, said semi-spherical recesses defining a substantially spherical cavity provided with a circular opening having a diameter less than the diameter of said spherical portion of said male element when said socket members are in a first position and said opening being enlarged to permit passage of said spherical portion of said male element into and from said insert when said socket members are in a second position, said insert constantly applying a biasing force to said socket members urging them to their second position, a bell-shaped camming member having its interior surface in the form of a frustum of a cone, the interior surface of said camming member being engageable with the outer surface portions of said socket members having the form of one-half of a frustum of a cone and being operable to move said socket members from their first position to their second position when said socket members are moved vertically in a particular direction with respect to said camming member to force the surfaces defining said semi-circular recesses of said insert tightly against said spherical portion of said male element, and a manually operable releasable lock device associated with each pair of cooperating socket members for preventing vertical movement of said socket members with respect to said camming member and pivoting of said socket members from their second position to their first position.

4. A motor vehicle substantially as set forth in claim 3, in which, the closed end of said camming member opposite the open end thereof is provided with an aperture, and said manually operable releasable lock device includes an elongated stem mounted in said aperture for vertical reciprocable movement, said stem having a flange-like end disposed within said camming member to provide a ledge for pivotally supporting said socket members.

5. A motor vehicle substantially as set forth in claim 4, in which, said lock device further includes handle means operatively connected to the end of the stem opposite the flange-like end, said handle means being rockable to a locked position wherein said socket members are incapable of moving vertically with respect to said camming member to their first position from their second position.

6. A motor vehicle substantially as set forth in claim 5, in which, spring means are provided for biasing said handle means to its locked position.

7. A motor vehicle having a longitudinal frame, a cab, and means for supporting said cab on said frame for controlled relative movement therebetween including, a pair of transversely spaced and aligned pivot connecting means interconnecting the forward portion of said cab and said frame whereby said cab is capable of pivoting about a transversely extending axis between a normally lowered position and a raised forwardly tilted position; and a pair of transversely spaced and aligned connecting means longitudinally spaced from said pivot connecting means yieldably interconnecting the rearward portion of said cab and said frame, each of said connecting means including a female element having an engaging surface and a male element having a substantially spherical portion adapted to be enveloped by said engaging surface of said female element, one of said elements being yieldably secured to said frame whereby said one element is immovable with respect to said frame in one direction and is capable of limited, resiliently resisted movement in the opposite direction with respect to said frame, and the other of said elements being carried by said body, said engaging surface of said female element being movable between first position wherein said engaging surface defines a substantially spherical cavity provided with a circular opening having a diameter less than the diameter of said spherical portion of said male element and a second position wherein said opening is expanded to permit passage of said spherical portion of said male element into and from said female element, cam means operable to move said engaging surface of said female element from its second position to its first position and force said engaging surface tightly against said spherical portion of said male element, and a manually operable releasable lock device associated with each of said connecting means for preventing said engaging surface of said female element from moving from its first position to its second position.

8. In a motor vehicle having a longitudinal frame and a body, the combination including said frame and body comprising, means for connecting said body to said frame for a control relative movement therebetween including a first pair of transversely aligned structures pivotally interconnecting one end of said body to said frame, the axis of said first pair of transversely aligned structures extending transversely with respect to the chassis frame; a second pair of transversely aligned structures yieldably interconnecting the opposite end of said body to said frame, each of said second pair of transversely aligned structures including a female element and a male element having a portion thereof insertable in a portion of said female element; means for operatively connecting one of said elements of each of said second pair of transversely aligned structures to said body; means for yieldably securing the other of said elements of each of said second pair of transversely aligned structures to said frame whereby each of said elements is immovable with respect to said frame in one direction and is capable of limited, resiliently resisted movement in the opposite direction with respect to said frame; and a manually operable releasable lock device associated with each of said second pair of structures for preventing disconnection of said male and female elements.

References Cited in the file of this patent

UNITED STATES PATENTS

| | | |
|---|---|---|
| 641,312 | Maier | Jan. 16, 1900 |
| 1,384,269 | Milner | July 12, 1921 |
| 1,435,182 | Shaw | Nov. 14, 1922 |
| 2,148,308 | Spear | Feb. 21, 1939 |
| 2,227,712 | Hackley | Jan. 7, 1941 |
| 2,725,251 | Wagner | Nov. 29, 1955 |
| 2,874,976 | Linn | Feb. 24, 1959 |

FOREIGN PATENTS

| | | |
|---|---|---|
| 346,464 | Great Britain | Apr. 16, 1931 |
| 585,235 | Great Britain | Feb. 3, 1947 |